Feb. 5, 1935. C. H. HAVILL ET AL 1,990,283
ENGINE STARTING MECHANISM
Filed Dec. 18, 1930  2 Sheets-Sheet 1
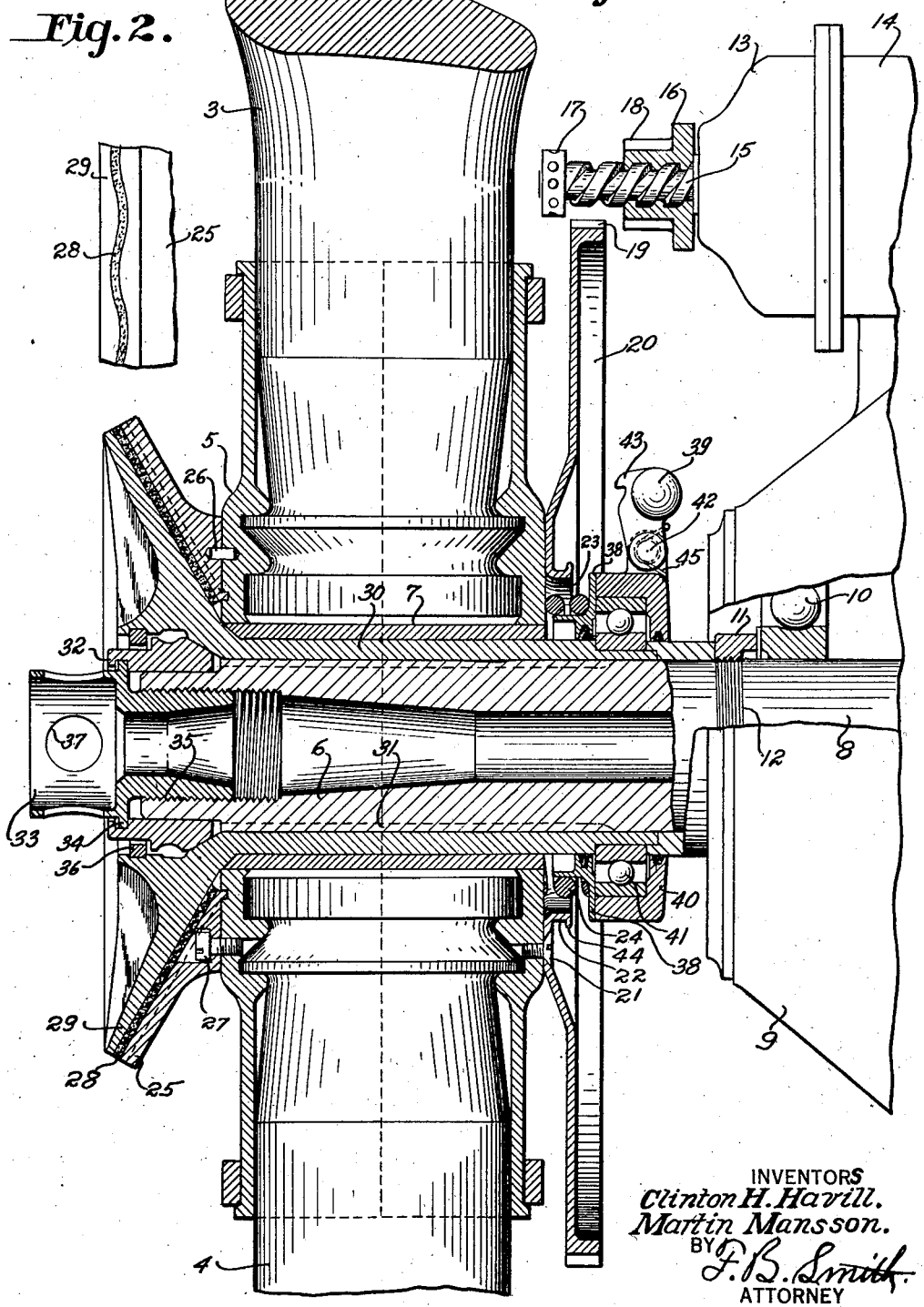

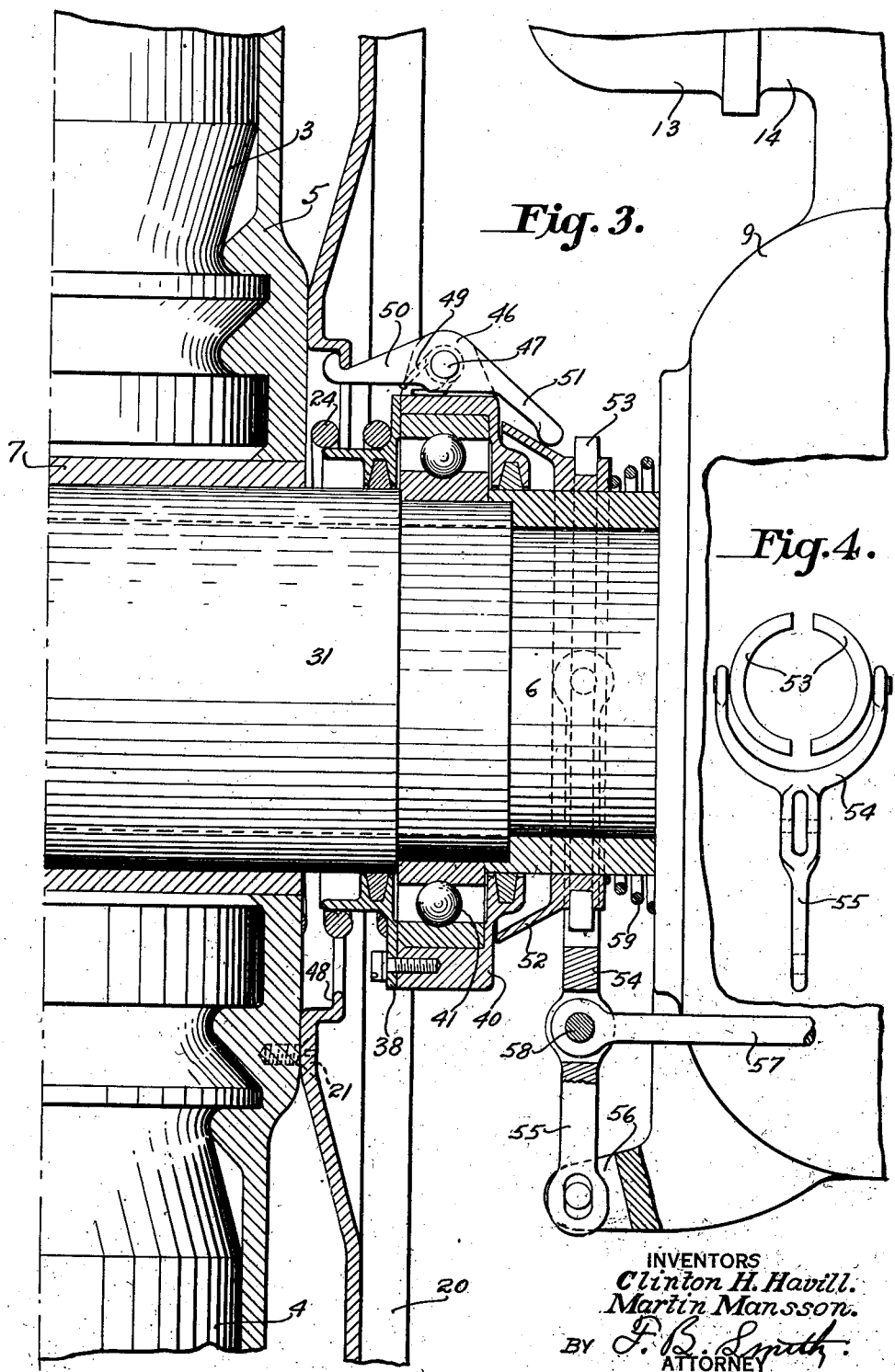

Patented Feb. 5, 1935

1,990,283

UNITED STATES PATENT OFFICE 1,990,283

ENGINE STARTING MECHANISM

Clinton H. Havill, South Orange, and Martin Mansson, East Orange, N. J., assignors to Eclipse Aviation Corporation, East Orange, N. J., a corporation of New Jersey Application December 18, 1930, Serial No. 503,282

6 Claims. (Cl. 123—179)

The present invention relates to engine starting means, and more particularly to starting mechanism adapted for use with aircraft engines.

It is one of the objects of the present invention to provide a novel engine starter of the inertia type, which is compact, efficient and positive in operation, and requires a minimum of parts.

Another object is to provide a novel engine starter of the inertia type embodying an inertia device adapted for free rotation on the crank shaft of the engine to be started and to be driven by the engine after the latter is operating under its own power.

Another object is to provide a novel engine starter of the type embodying an inertia device arranged for free rotation on the crank shaft of the engine to be started and adapted, upon reaching a predetermined speed, to be automatically connected in driving engagement with the crank shaft and thereafter to be driven by the engine after the latter is operating under its own power.

A further object is to provide a novel engine starter of the inertia type particularly adapted for starting aircraft engines and which is embodied in the propeller drive as a part thereof.

Another object is to provide in a novel aircraft engine starter of the inertia type embodying the propeller as the inertia member, means whereby the propeller may be rotated freely on the engine crank shaft to store energy in said propeller and thereafter, upon a predetermined speed being reached by the propeller, the latter may be automatically drivably connected to the crank shaft to start the engine.

A still further object is to provide novel aircraft engine starting mechanism of the inertia type, which includes the propeller of the aircraft as the inertia member, means for rotating the propeller independently of and on the engine crank shaft to store energy in said propeller, and speed responsive means for thereafter automatically drivably connecting the propeller to the shaft to impart the stored energy to the latter, whereby the engine is started.

Another object is to provide a novel aircraft engine starting mechanism of the inertia type, which includes the propeller of the aircraft as the inertia member, means for freely rotating the propeller on the engine crank shaft to store energy therein, and means including a clutch for thereafter drivably connecting the propeller to said shaft upon a predetermined speed of the propeller being reached, for imparting the energy stored in the latter to the engine crank shaft, whereby the engine is started.

Still another object of the invention is to provide in engine starting mechanism of the above type which includes the propeller of the aircraft as the inertia member, novel means including a clutch for drivably connecting the propeller to the engine crank shaft whereby, during the rotation of the propeller by the engine after the latter is operating under its own power, the thrust of the propeller is effective to increase and maintain the driving engagement between the propeller and the crank shaft.

The above and other objects and advantages will appear more fully hereinafter from a consideration of the detailed description which follows, together with the accompanying drawings, wherein is illustrated one embodiment of the invention. It is to be expressly understood, however, that the drawings are for the purpose of illustration and description only, and are not to be construed as a definition of the limits of the invention, reference being had for this purpose to the appended claims.

In the drawings, wherein like reference characters refer to like parts throughout the several views, Fig. 1 is a partial axial sectional view, with parts broken away, of one form of starter mechanism embodying the present invention;

Fig. 2 is a side view of a portion of one form of clutch employed in accordance with the invention;

Fig. 3 is a partial axial sectional view of another embodiment of the invention; and Fig. 4 is a plan view of one form of actuating device employed in the embodiment shown in Fig. 3.

Referring to the drawings, and more particularly Fig. 1, the starter mechanism is of the type wherein an inertia member is adapted to be rotated and brought up to a predetermined speed to store energy therein and thereafter drivably connected to the engine crank shaft for imparting the stored energy to the latter, whereby the engine is started.

In the form shown, the inertia member is constituted by the propeller having blades 3 and 4, portions of which are broken away, mounted in a hub member 5, the latter being free to rotate on the propeller shaft 6 by means of a sleeve bearing 7, thereby permitting longitudinal movement of the hub along the propeller shaft for a purpose to be described hereinafter. The blades 3 and 4 and hub 5 are adapted to be drivably connected to shaft 6 in a manner to be described more fully hereinafter, but are also adapted for free rotation on said shaft, the latter being drivably connected in any suitable manner to or formed integrally with the engine crank shaft, a portion of which is shown at 8. The engine crank shaft is journaled in the engine casing 9 in any suitable manner, as for example, by means of a ball bearing 10 which is held in place by means of the bearing retainer 11 threaded on the crank shaft as indicated at 12.

Means are provided for rotating the propeller and hub on shaft 6 when the driving connection referred to above is rendered ineffective, i. e., when the propeller blades and hub are freely rotatable on said shaft, in order to store energy in the propeller for subsequent use in cranking and starting the engine. In the form shown, said means comprise an electric motor 13 supported in a housing 14 which may be secured to or formed integral with the engine casing 9. The armature shaft of the electric motor is provided at its outer end with screw threads 15, which, together with the internally threaded pinion 16, correspond to a type of transmission mechanism well known in the engine starting art; said pinion being adapted for longitudinal movement along the threaded portion of the armature shaft when the latter is rotated. A stop nut 17 is secured to the end of the armature shaft to limit the movement of the pinion 16. The teeth 18 of the latter are adapted to mesh with the teeth 19 of a large external gear 20 secured to the hub member in any suitable manner, as by means of screws 21. The gear 20 is provided with an internal and outwardly extending peripheral flange 22 adjacent the hub member 5 to afford a central opening 23 through which a heavy coil spring 24 is adapted to pass and abut hub member 5.

As will be understood by those skilled in the art, the electric motor 13 is effective to move pinion 16 into driving engagement with teeth 19 on the gear 20, thereby causing the propeller blades and hub to rotate to store energy therein. Suitable gearing may be provided between the hub and electric motor so that the propeller may be brought up to the required speed without necessitating extremely high speeds of either the pinion 16 or the armature of the motor.

Means are provided, whereby, after the propeller has been brought up to a predetermined speed, as for example 300 R. P. M. or any other suitable speed, depending on the characteristics of the propeller and engine, the same may be drivably connected with the engine crank shaft for imparting the stored energy to said crank shaft to start the engine. In the embodiment illustrated, said means comprise a clutch which, in the form shown, is constituted by a frusto-conical clutch member 25 secured to the hub member 5 in any suitable manner, as by means of dowel pins 26 and screws 27, and a corresponding frusto-conical clutch member 29. The inside surface of the clutch member 25 is faced with a suitable friction material 28, and is corrugated or waved, as indicated in Fig. 2, to provide a greater gripping action and prevent slipping. The clutch member 29 is provided with an extending sleeve portion 30 which passes through the sleeve bearing 7 and is keyed to the shaft 6, as indicated at 31, whereby said clutch member is caused to rotate with the shaft. The latter clutch member is locked endwise on the shaft 6 by means of a member 32 adapted to be slipped over the end of the shaft and held thereon by means of the member 33 provided with peripheral projections 34 which form a bayonet-lock with slots in the member 32, said member 33 being threaded in the shaft as indicated at 35. A split spring ring 36 is interposed between the clutch member 29 and the member 32 for facilitating withdrawal of the clutch member 29 by the exertion of a pull on the outer end of the member 33, which is provided with apertures 37 for the reception of a rod, whereby said member may be tightened within the shaft 6, and whereby the assembly of parts including the members 32, 36 and 29 may be withdrawn as a unit.

The clutch members 25 and 29 are normally maintained in engagement with each other by means of the heavy coil spring 24 which is interposed between the hub member 5 and a flanged collar 38 surrounding the extension 30 of clutch member 29. It will be seen that the spring normally retains the friction elements of the clutch in driving engagement whereby a driving connection is established between the shaft and the propeller.

It is to be particularly noted that the arrangement of the clutch members 25 and 29 with respect to the propeller and crank shaft is such that during the rotation of the former by the latter after the engine is operating under its own power, the thrust of the propeller is effective to increase and maintain the driving engagement between the propeller and the driving shaft. Due to the effect of this propeller thrust, which is quite large, and to the wavy surface of the friction elements of the clutch, slippage is eliminated and a positive and relatively rigid driving engagement maintained. It will be apparent that in order to obtain this thrust effect the clutch must necessarily be located on that side of the propeller which is opposite to the thrust faces of the propeller blades, i. e., in a "pusher" type airplane the clutch would be located on the opposite side of the propeller to that shown in the drawings.

Means are provided for disengaging the clutch members 25 and 29 during the time that the propeller is being brought up to speed, and in the form shown, said means comprise a centrifugally actuated locking device which is adapted to lock the hub member when the latter is manually moved to the right, as viewed in the drawings against the action of the coil spring 24 and adapted, upon a predetermined speed being reached, to release the hub member, the latter then being moved longitudinally to the left, by means of the spring to establish the driving connection. The friction elements are thus first disengaged, and the propeller is free to rotate on shaft 6, and then are automatically actuated into engagement after the propeller is brought to the required speed.

In the form shown, the centrifugally actuated locking device includes a plurality of weights, preferably three or more, one of which is shown at 39, arranged circumferentially on a collar 40 journaled on the sleeve 30 by means of ball bearing 41. The weights 39 are pivoted at 42 and have a rib formed integral therewith preferably in the shape of a finger 43 which is adapted to engage a peripheral lip 44 on the flange 22 of the gear 20 when the hub is moved to the right against the tension of the spring 24, thereby drivably connecting the collar 40 with the hub so that it may rotate with the latter. A coil spring 45 is provided for normally holding the weights down so that the fingers may readily engage the lip 44 when the propeller and hub are pushed to the right in preparation for starting the engine. The large force of the coil spring 24 adds to the effectiveness of the engagement between the lip and the weights until the latter fly outwardly against the tension of springs 45 by the action of centrifugal force produced by the rotation of the propeller. The weights 39 may be designed so that they may fly outwardly at any desired speed.

When it is desired to start the engine, the blades and hub are manually or by other appropriate means pushed to the right, as viewed in the drawings, against the force of the spring 24 until the flange 22 abuts the collar 38, and the weights engage the flange by means of the fingers 43 and the lip 44, thereby disengaging the friction elements of the clutch and locking them in disengaged position. The electric motor 13 is now energized and the propeller is brought up to speed to store energy therein. As soon as the desired speed is reached, which is determined by the size of the weights 39, the latter are caused to fly outwardly by the action of centrifugal force, thereby releasing the gear and hub, and causing the propeller to be moved longitudinally to the left and thus drivably connecting the propeller to its shaft and imparting the energy stored in said propeller to the crank shaft 8 to crank and start the engine. As soon as the engine is operating under its own power, the gear overruns the pinion, causing the latter to be moved longitudinally out of engagement with the gear. The propeller now being driven by the engine due to the driving engagement therebetween through the clutch members by the action of the spring 24, a large thrust is produced on the hub of the propeller which acts to increase the pressure of clutch member 25 against clutch member 29 in addition to the force of the spring 24.

Fig. 3 illustrates another embodiment of the invention, wherein manually controlled means are employed for drivably connecting the inertia member with the engine crank shaft after the inertia member has been brought up to a predetermined speed to store energy therein. In the form shown, said means are constituted by a plurality of locking dogs, preferably three, one of which is shown at 46, arranged circumferentially on the collar 40 in a manner similar to the arrangement of the centrifugal weights 39 in Fig. 1. Each of the locking dogs is pivoted at 47 and held by means of a spring 49, in a position to readily engage an inwardly extending circumferential flange 48 on the gear 20 when the propeller is manually forced to the right. In order to cause such engagement each of the dogs is provided with a forward hooked extension or finger 50 and with a rearwardly extending arm 51 arranged to bear against a tapered or substantially frusto-conically shaped collar 52.

Means are provided whereby the collar 52 may be actuated in order to trip the locking dogs by forcing the arms 51 thereof upwardly and causing the fingers 50 to release the hub 5 and, in the embodiment illustrated, particularly in Fig. 4, said means comprise a split ring 53 secured to the collar 52 in any suitable manner as, for example, by pressing the ring into a circumferential groove on the collar.

The ring is pivotally mounted in a yoke 54 which is provided with an extension 55 adapted to be pivotally secured at its end to a projection 56 of the engine casing 9. An actuating rod, a portion of which is shown at 57, is pivotally secured to the extension 55 of the yoke 54 by means of a pin 58. The rod is arranged to extend to the operator's seat (not shown) so that it may be readily accessible for actuation by the operator. A coil spring 59 is interposed between the rear face of the collar 52 and the engine casing so as to normally hold the collar in the position indicated in Fig. 3.

It will be apparent that upon actuation of the rod 57 to the right as viewed in Fig. 3, the yoke 54 will move the collar 52 to the right against the tension of the spring 59. Due to the tapered surface of the collar 52, movement of the latter will cause the arms 51 of the locking dogs to be raised and the fingers 50 to be lowered against the action of the springs 49, thereby releasing the propeller.

When it is desired to start the engine the blades and hub are pushed to the right, as viewed in Fig. 3, against the force of the spring 24 until the inwardly extending flange 48 is locked by the fingers 50 of the locking dogs, thereby disengaging the friction elements of the clutch and locking them in such disengaged position. The electric motor is now energized and the propeller brought up to speed to store energy therein. As soon as the desired speed is reached so that the required energy is stored in the propeller, the rod 57 is actuated by the operator, thereby releasing the gear and hub, causing the propeller to be moved longitudinally to the left and thus drivably connecting the propeller to its shaft and imparting the energy stored in said propeller to the crank shaft to crank and start the engine. As soon as the engine is operating under its own power the gear overruns the pinion driven by the electric motor, causing the pinion to be moved longitudinally out of engagement with the gear as in the embodiment shown in Fig. 1.

There is thus provided a novel engine starting mechanism of the inertia type, particularly adapted for starting aircraft engines, which is efficient and positive in operation and requires a minimum number of parts, in that the propeller blades themselves are employed for storing kinetic energy therein, thereby dispensing with a separate inertia member.

Means are also provided whereby the propeller is automatically drivably connected to the propeller shaft when a predetermined speed is reached, thereby eliminating timing of the propeller prior to causing engagement thereof with the propeller shaft. Also, because of the direct connection of the starter mechanism with the propeller drive, the thrust of the propeller is effectively employed for insuring a positive driving engagement between the propeller and the crank shaft. Bulky gear trains or driving mechanisms are also eliminated, thereby reducing the weight of the engine and increasing the carrying load of the vehicle.

While only two embodiments of the invention have been illustrated, other changes and modifications which will now appear to those skilled in the art may be made without departing from the scope of the invention, as for example, a suitable gear train may be provided between the pinion 16 and gear 20, or between the pinion and the armature shaft of the electric motor so that any desired speed ratio may be obtained between the electric motor and the propeller. It is also to be expressly understood that the clutch and the centrifugally operated locking device may be made in various mechanical forms, as for example, a positive type clutch may be employed in certain installations. Reference is therefore to be had to the appended claims for a definition of the limits of the invention.

This application is of common ownership with the Smith application, No. 503,281, filed on even date herewith, and reference is to be had to said co-pending application for claims to that portion of the present disclosure which is common to both. The speed responsive factor recited in the appended claims is one of the distinguishing features of the present disclosure.

What is claimed is:

1. In engine starting mechanism for aircraft, the combination of a propeller shaft drivably connected to the engine to be started, a propeller arranged for free rotation on said shaft, means independent of said propeller for rotating the latter to bring it up to a predetermined speed for storing energy therein, means including a clutch for drivably connecting said propeller to said shaft for starting the engine under its own power, means for maintaining said clutch disengaged while the propeller is being brought up to a predetermined speed, and speed responsive means associated with the propeller effective upon the predetermined speed being reached to cause engagement of said clutch.

2. In engine starting mechanism, the combination of a drive shaft of the engine to be started, an inertia device adapted for free rotation on said shaft, means independent of said inertia device for rotating the latter to bring it up to a predetermined speed for storing energy therein, means including a clutch member operatively connected with the drive shaft, and a complementary clutch member operatively connected with the inertia device, means adapted to cause engagement of said clutch members, and speed responsive means for maintaining said clutch members out of engagement while the inertia device is being brought up to a predetermined speed and effective upon the predetermined speed being reached to release said last mentioned means.

3. In starting mechanism for aircraft engines, the combination of a propeller shaft drivably connected to the engine to be started, a propeller arranged for free rotation on said shaft, means for rotating the propeller to bring it up to a predetermined speed to store energy therein, a clutch for thereafter drivably connecting the propeller to the shaft to crank the engine to be started, means for locking the propeller so that the elements of the clutch are maintained in disengaged position during the rotation of the propeller to bring the latter up to speed, and manually operated means for tripping said locking means so that the elements of the clutch are caused to engage.

4. In combination with an aircraft propeller and a drive shaft extending thereto, a prime mover for rotating said propeller independently of said drive shaft, a hub connected to the propeller and surrounding said drive shaft and adapted to be actuated by said prime mover, means for drivably connecting said hub and drive shaft, and speed responsive means for rendering said connecting means effective.

5. In combination with an aircraft propeller and a drive shaft extending thereto, a speed responsive friction clutch including a member which frictionally engages the propeller hub for drivably connecting said hub and shaft, and means for producing initial rotation of said propeller prior to engagement of said friction clutch.

6. In combination with an aircraft propeller and a drive shaft extending thereto, a prime mover for maintaining the craft in flight through actuation of said propeller, means including a friction clutch one member of which frictionally engages the propeller hub for drivably connecting said hub and shaft, means for producing initial rotation of said propeller independently of said drive shaft, and means for maintaining said friction clutch inoperative until the propeller is accelerated to a predetermined speed.

CLINTON H. HAVILL.
MARTIN MANSSON.